UNITED STATES PATENT OFFICE 2,580,277

POLYMERIZATION OF VINYL CHLORIDE IN AQUEOUS SUSPENSION TO PRODUCE GRANULAR POLYMERS

Thomas Boyd and Fred J. Lucht, Springfield, Mass., assignors to Monsanto Chemical Company, St. Louis, Mo., a corporation of Delaware No Drawing. Application June 22, 1948, Serial No. 34,545

12 Claims. (Cl. 260—78.5)

This invention relates to vinyl halide-containing polymeric products. More particularly, this invention relates to granular vinyl halide-containing polymers.

For many purposes, it is desirable to prepare vinyl halide-containing polymers in granular form. This may be accomplished by subjecting to polymerization conditions aqueous suspensions of the polymerizable material. A critical feature in such a process is the nature of the suspending agent which is employed. Numerous materials have been suggested for this purpose, but many of them are subject to drawbacks of one nature or another.

It is an object of this invention to provide vinyl halide-containing polymeric products in granular form. A particular object of this invention is to provide a process for polymerizing aqueous suspensions of vinyl halide-containing materials to form finely divided granular polymers.

These and other objects are accomplished according to this invention by polymerizing vinyl halide-containing materials in an aqueous suspension in the presence of an aliphatic acid ester of a polyethylene glycol and a water-soluble polymerization catalyst. Thus, it has been discovered that polymers prepared in this manner are granular in form and a large proportion of the granules are exceedingly small and uniform in size.

The following examples are illustrative of the present invention, but are not to be considered as limitative thereof. Where parts are mentioned, they are parts by weight.

Example I

| | Parts |
|---|---|
| Vinyl chloride | 350 |
| Water | 525 |
| $K_2S_2O_8$ | 1.0 |
| Polyethylene glycol monostearate | 1.75 |

The above ingredients are placed in a glass vessel capable of withstanding the pressure developed during polymerization and the vessel is then sealed. Thereafter the vessel is agitated while immersed in a liquid bath maintained at a temperature of 40° C. for 17 hours.

As a result of the above treatment, it is found that more than 85% of the vinyl chloride is converted to polymer. The polymer is separated from the aqueous medium by filtration. It is noted that the filtrate is entirely clear, indicating that no emulsion polymer is produced. The polymer, after drying, is subjected to a screening analysis with the following results:

| | Percent |
|---|---|
| Retained on 40-mesh screen | 38.5 |
| Retained on 60-mesh screen | 0.7 |
| Retained on 80-mesh screen | 0.7 |
| Retained on 100-mesh screen | 1.0 |
| Retained on 200-mesh screen | 13.6 |
| Balance (<200-mesh) | 45.5 |

From the screen analysis, it is to be seen that almost half of the polymer has a particle size less than 200-mesh. Microscopic examination of both this fraction and the fraction passing through the 100-mesh screen, but not through the 200-mesh screen, shows that the particles comprise individual spheres.

It is surprising that the use of polyethylene glycol monostearate leads to a granular polymer since this compound is of the nature of a surface-active agent and ordinarily surface-active agents tend to produce emulsion polymers when used in concentrations of .1% or more, based on the amount of monomer; and at lower concentrations, undesirable results are obtained.

Example II

Example I is repeated, except that the amount of the polyethylene glycol monostearate is increased to 3.5 parts. The polymer which is obtained has generally the same characteristics as the polymer of Example I except that the proportion of particles passing through the 100-mesh screen is somewhat lower. The following is the screen analysis of the dried polymer of this example:

| | Percent |
|---|---|
| Retained on 40-mesh screen | 47.5 |
| Retained on 60-mesh screen | 1.6 |
| Retained on 80-mesh screen | 3.3 |
| Retained on 100-mesh screen | 2.6 |
| Balance (<100-mesh) | 45.0 |

The polyethylene glycol monostearate used in Examples I and II is made by forming the monoester of polyethylene glycol, said glycol having an average molecular weight of 1,000. Similar results are obtained by substituting in Examples I and II esters of polyethylene glycol, in which the glycol has an average molecular weight of 400. Typical esters of this glycol which may be used are the monooleate, monolaurate, the monostearate and the distearate of this polyethylene glycol.

Example III

Example I is repeated except that 10% of the vinyl chloride is replaced by an equal weight of vinyl acetate. The resulting polymer is found to be granular in nature and to be made up of a large proportion of exceedingly fine and uniform grains.

Example IV

Example I is repeated except that 10% of the vinyl chloride is replaced by an equivalent amount of vinylidene chloride. Again a granular polymer results containing a large proportion of small and uniform particles.

Example V

Example I is repeated except that 5% of the vinyl chloride is made up of an equal amount of dimethyl maleate. The copolymer which is formed has physical characteristics similar to those of the product of Example I.

Example VI

Example I is repeated except that 20% of the vinyl chloride is replaced by an equal amount of diethyl maleate. The product comprises a granular material made up substantially of fine and uniform grains.

Numerous variations may be introduced into the polymerization process of the invention as illustrated by the specific examples. Thus, the amount of the suspending agent may be substantially varied. However, it is usually found that at least 0.01% of the suspending agent is desirable, based on the amount of polymerizable material. On the other hand, more than 10% of the suspending agent is frequently not particularly desirable since in some cases the effectiveness of the suspending agent may fall off when large amounts are used. A particularly preferred range of proportions is 0.1-3% of the suspending agent, based on the amount of polymerizable monomeric material.

Various aliphatic acids may be used in preparing the polyethylene glycol esters and the esters made therefrom may be either mono- or diesters of polyethylene glycols. The acid residues in the esters may be saturated or unsaturated. In addition, they may be substituted by such groups as hydroxyl, halogen and the like.

Examples of saturated acids which may be used in forming the esters are ethanoic acid, propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid and nonadecanoic acid. These acids may have straight or branched chains or substituted chains, and may be substituted, for example, with chlorine or other halogen atoms, as for example, monochlorooctadecanoic acid and the like.

Examples of unsaturated aliphatic acids which may be used in forming the esters include monoolefinic aliphatic acids such as propenoic acid, 2-butenoic acid, 2-methyl-2-propenoic acid, 3-butenoic acid, 2-pentenoic acid, 4-pentenoic acid, 2-methyl-2-butenoic acid, 2-hexenoic acid, 3-hexenoic acid, 7-hexadecenoic acid, 10-undecenoic acid, 13-docosenoic acid and 9-octadecenoic acid; diolefinic-unsaturated aliphatic acids such as 2,4-pentadienoic acid, 2,4-hexadienoic acid, 3,7-dimethyl-2,6-octadienoic acid, 9,12-octadecadienoic acid; triolefinic-unsaturated aliphatic acids such as 3,7-dimethyl-2,4,6-octatrienoic acid, 9,12,15-octadecatrienoic acid, 9,11,13-octadecatrienoic acid; substituted olefinic acids, for example, such hydroxy olefinic acids as 16-hydroxy-7-hexadecenoic acid and 12-hydroxy-9-octadecenoic acid; halogenated unsaturated acids, for example, 2-chloro-2-propenoic acid, 3-chloro-2-propenoic acid, mono-chloro-9-octadecenoic acid, monochloro-12-hydroxy-9-octadecenoic acid and halogenated acids derived by dehydration of castor oil acids followed by chlorination; acetylenic unsaturated aliphatic acids such as propynoic, butynoic, pentynoic, amyl propynoic acids, 7-hexadecynoic, 9-octadecynoic and 13-docosynoic acids.

Examples of hydroxy-substituted acids which may be used in forming the polyethylene glycol esters include 2-hydroxy-3-butenoic acid, 12-hydroxy-octadecanoic acid, 9,10-hydroxy-octadecanoic acid, 12-hydroxy-dodecanoic acid, 16-hydroxy-hexadecanoic acid, 11-hydroxy-hexadecanoic acid, 10-hydroxy-octadecanoic acid, 3,12-dihydroxy-hexadecanoic acid, 9,10,16-hydroxy-hexadecanoic acid, 9,10,12,13-hydroxy-octadecanoic acid, 16-hydroxy-7-hexadecenoic acid, 12-hydroxy-9-octadecenoic acid.

A particularly preferred group of esters are those in which the acid residues contain 10–20 carbon atoms.

The polyethylene glycols which are used in preparing the ester suspending agents of the invention are usually formed by reaction of ethylene oxide with ethylene glycol in the presence of an alkaline catalyst and with the degree of addition of the ethylene oxide controlled to produce the molecular size desired. The polyethylene glycols are sometimes also referred to as polyoxyethylene glycols. The molecular weight of the polyethylene glycols may be substantially varied, for example, from 200 to 6000 or more. A particularly preferred group of suspending agents are those which are made from polyethylene glycols having average molecular weights of 400 to 4000.

In carrying out the process of the invention, the polymerizing temperature may be substantially varied, and the temperature employed is governed by the particular characteristics desired in the polymeric material and the nature of the material being polymerized. In the case of vinyl halides and many mixtures of vinyl halides and materials copolymerizable therewith, temperatures of 30–100° C. are usually employed.

In carrying out the polymerization process of the invention, it is generally preferred that a water:monomer weight ratio of at least 1:1 be used, but generally, the water:monomer ratio does not exceed 9:1.

The process of this invention is useful in the polymerization of vinyl chloride and the polymerization of vinyl chloride in admixture with such water-insoluble unsaturated compounds as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid, vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene, dienes such as butadiene, chloroprene; amides such as acrylic acid amide; nitriles, such as acrylic acid nitrile; esters of α,β-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like.

In the case of copolymerization, at least 10% and according to a preferred embodiment, a predominant portion, i. e., more than 50% by weight, of the mixture of monomers is a vinyl halide, especially vinyl chloride.

A particularly preferred embodiment of the invention comprises the polymerization of a mixture of vinyl chloride and an ester of an α,β-unsaturated dicarboxylic acid such as diethyl maleate, in which 5-20 parts by weight of the ester are used for every 95-80 parts by weight of vinyl chloride. Among the preferred esters of α,β-unsaturated dicarboxylic acids are the alkyl esters in which the alkyl group contains 1-8 carbon atoms.

In place of potassium persulfate other water-soluble percompounds may be used to catalyze the polymerization reaction. Examples of such compounds include hydrogen peroxide, acetyl peroxide, ammonium persulfate and other water-soluble percompounds well known to those skilled in the art. The amount of catalyst may vary, depending upon the reaction conditions employed, e. g., temperature and the nature of the polymerizable material. Usually, it is found that 0.001 to 5 parts of potassium persulfate for every 100 parts of vinyl chloride represents a desirable amount of catalyst. Other water-soluble percompounds may be used in proportions containing corresponding amounts of available oxygen.

The foregoing description is given in illustration and not in limitation of the invention as set forth in the appended claims.

What is claimed is:

1. A process for preparing fine-grained polymeric products which comprises polymerizing a polymerizable material containing vinyl chloride while dispersed in an aqueous medium containing, as the sole dispersing agent, from 0.1 to 3% by weight of an aliphatic acid ester of a polyethylene glycol, the glycol residue of said ester having an average molecular weight of from 400 to 4000, and the acid residue having from 10-20 carbon atoms.

2. A process as defined in claim 1 in which the glycol ester is a diester.

3. A process as defined in claim 1 in which the glycol ester is a monoester.

4. A process as defined in claim 1 in which the polymerizable material is vinyl chloride.

5. A process as defined in claim 1 in which the aqueous dispersion contains a mixture of vinyl chloride and an unsaturated compound polymerizable therewith.

6. A process as defined in claim 5 in which the compound polymerizable therewith is a vinyl ester of a lower aliphatic acid.

7. A process as defined in claim 6 in which the vinyl ester is vinyl acetate.

8. A process as defined in claim 5 in which the compound polymerizable therewith is an alkyl ester of an α,β-unsaturated dicarboxylic acid in which the alkyl groups contain less than 9 carbon atoms.

9. A process as defined in claim 8 in which the ester is diethyl maleate.

10. A process as defined in claim 1 in which the dispersing agent is the octadecanoic acid monoester of the polyethylene glycol.

11. A process as defined in claim 1 in which the dispersing agent is the octadecanoic acid diester of the polyethylene glycol.

12. A process as defined in claim 1 in which the dispersing agent is the 9-octadecenoic acid monoester of the polyethylene glycol.

THOMAS BOYD.
FRED J. LUCHT.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,366,306 | Alexander et al. | June 2, 1945 |
| 2,395,344 | Schoenfeld | Feb. 19, 1946 |
| 2,445,970 | Reinhardt | July 27, 1948 |
| 2,449,489 | Larson | Sept. 14, 1948 |
| 2,470,909 | Baer | May 24, 1949 |
| 2,511,593 | Lightfoot | June 13, 1950 |